United States Patent [19]

Hottinger et al.

[11] Patent Number: 5,123,035
[45] Date of Patent: Jun. 16, 1992

[54] PROCESSING CIRCUIT FOR SIGNALS SUPPLIED BY TWO TRANSDUCERS MEASURING A PHYSICAL PARAMETER IN THE DIFFERENTIAL MODE

[75] Inventors: Werner Hottinger; Fridolin Wiget, both of Neuchâtel, Switzerland

[73] Assignee: Asulab S.A., Switzerland

[21] Appl. No.: 565,334

[22] Filed: Aug. 10, 1990

[30] Foreign Application Priority Data

Sep. 1, 1989 [CH] Switzerland .......................... 3186/89

[51] Int. Cl.$^5$ ...................... G01D 5/243; G01D 3/04; G01L 1/16
[52] U.S. Cl. ........................................ 377/20; 377/23; 377/39; 73/517 AV
[58] Field of Search ......................... 377/22, 23, 39, 20; 73/517 R, 517 AV, 721

[56] References Cited

U.S. PATENT DOCUMENTS

| | | | |
|---|---|---|---|
| 4,479,385 | 10/1984 | Koehler | 73/517 R |
| 4,485,452 | 11/1984 | Cording et al. | 377/23 |
| 4,558,456 | 12/1985 | Bezard et al. | 377/39 |
| 4,896,268 | 1/1990 | Macgugan | 73/517 AV |

FOREIGN PATENT DOCUMENTS 0101669 6/1984 European Pat. Off. .
0316644 5/1989 European Pat. Off. .

OTHER PUBLICATIONS

Electronics & Wireless World, vol. 84, No. 1514, Oct. 1978, pp. 75-76 entitled "Frequency Synthesizers-2" by R. Thompson.

Primary Examiner—John S. Heyman
Attorney, Agent, or Firm—Pollock, Vande Sande & Priddy

[57] ABSTRACT

A processing circuit is provided for signals ($S_1$, $S_2$) supplied by two transducers measuring a physical quantity parameter in a differential mode and delivering a signal representative of this parameter. This processing circuit essentially comprises a first counter for counting within a measurement period an integer $N_1$ of periods $T_1$ of the signal $S_1$, a second counter for counting within this period of measurement an integer $N_2$ of periods $T_2$ of the signal $S_2$, and a logic circuit to deliver a signal $S_m$ representative of the difference between the interval $N_1 \cdot T_1$ and the interval $N_2 \cdot T_2$, this signal being representative of the value of the physical parameter. The circuit is useful for measuring acceleration, force, pressure or temperature.

13 Claims, 3 Drawing Sheets

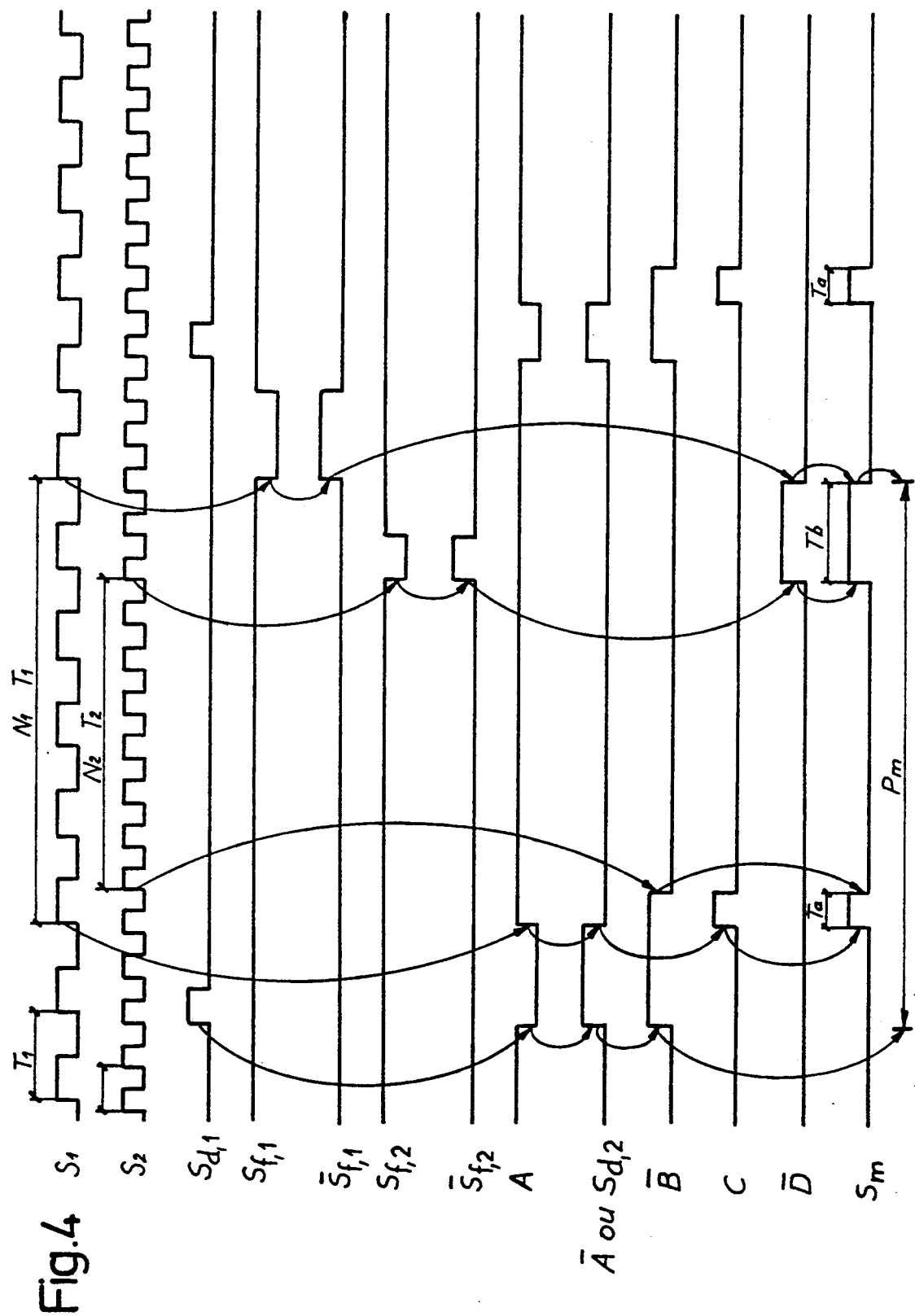

5,123,035

PROCESSING CIRCUIT FOR SIGNALS SUPPLIED BY TWO TRANSDUCERS MEASURING A PHYSICAL PARAMETER IN THE DIFFERENTIAL MODE

FIELD OF THE INVENTION

It is an object of the present invention to provide a circuit for processing signals supplied by two transducers measuring in the differential mode a physical parameter, and delivering a logic signal representative of the numerical value of this parameter which may be a force, acceleration, pressure, temperature or displacement, etc.

BRIEF SUMMARY OF THE INVENTION

The circuit in accordance with the invention, which receives a first signal having a first period from one of the transducers, and a second signal having a second period from the other transducer, these periods varying inversely from each other according to the physical parameter, is of particular note in that it comprises:

a first counting means for counting within one measurement period an integer $N_1$ of periods $T_1$ of the first signal $S_1$, a second counting means for counting within the said measurement period an integer $N_2$ of periods $T_2$ of the second signal $S_2$, and a logic circuit for delivering a signal $S_m$ representative of the difference between the time interval $N_1 \cdot T_1$ of counting of the first counting means and the time interval $N_2 \cdot T_2$ of counting of the second counting means, this signal $S_m$ being representative of the value of the said physical parameter.

In preferred manner, counting means are used to permit the value of the integers $N_1$ and $N_2$ to be varied in the way of, for example, binary counters or dividers with adjustable rates of division. $N_1$ and $N_2$ may thus be adjusted according to the characteristics of the transducers (which can vary slightly, even in the case of transducers originating in the same production batch) and according to the operating conditions of the transducers (temperature variation, pretensions, ...).

It is clear that depending on the values selected for $N_1$ and $N_2$ and the time of commencement of counting by the two counting means, the time intervals of length $N_1 \cdot T_1$ and $N_2 \cdot T_2$ may follow one upon the other, partially overlap or the one be encompassed in the other.

In order to simplify the structure of the logic circuit, $N_1$ and $N_2$ are for preference selected so that the time interval $N_1 \cdot T_1$ is always greater than the time interval $N_2 \cdot T_2$ and counting by the second counting means is made to commence after the commencement of counting by the first counting means, the delay being adopted so that the second counting means terminates its counting before the first counting means.

BRIEF DESCRIPTION OF THE DRAWINGS

Other characteristics and advantages of the signal processing circuit in accordance with the invention will become apparent from the following description of a possible embodiment of this circuit, accomplished within the context of an accelerometer. This description which is solely of an explanatory nature and which is obviously not limitative refers to the accompanying drawings in which:

FIG. 4 is a diagram which shows the form of the principal signals occurring in the circuits represented in FIGS. 2 and 3;

DETAILED DESCRIPTION OF THE INVENTION

Figure 1:
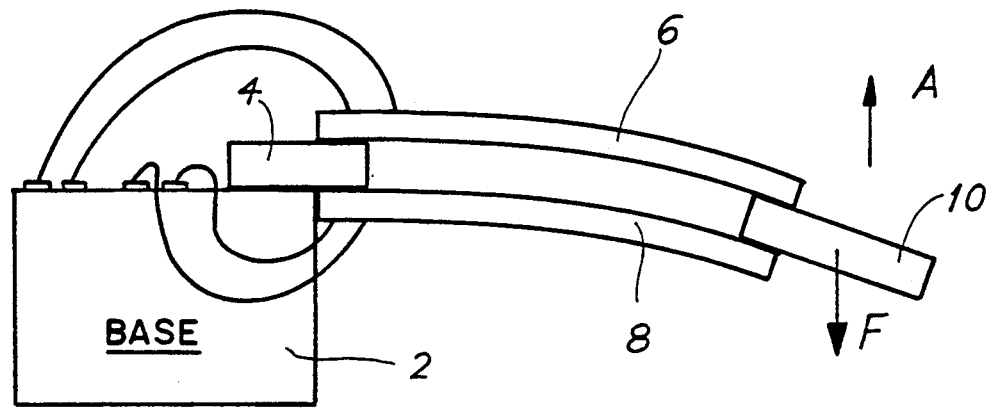
FIG. 1 shows in diagrammatic form a vertical section of an example of a differential accelerometer which comprises two quartz resonators.

The accelerometer which is represented in diagrammatic form in FIG. 1 is designed to permit the measurement of linear acceleration. This accelerometer comprises a base 2 on which is fitted a support 4 which is of rectangular profile and of which a part projects from this base. On the respective opposing faces of this part of the support 4 there are attached by one of their extremities, two quartz resonators 6 and 8, the other extremities of these resonators being attached to the opposing parallel faces of a free plate 10 of mass M.

The quartz resonators 6 and 8 are quartz wafers which are of parallelepiped form and which comprise electrodes not shown in the drawing. These resonators are so constructed that their natural frequency varies as a function of the longitudinal influences to which they are subjected, an extension causing this frequency to increase, and a compression causing it to diminish.

Figure 2:
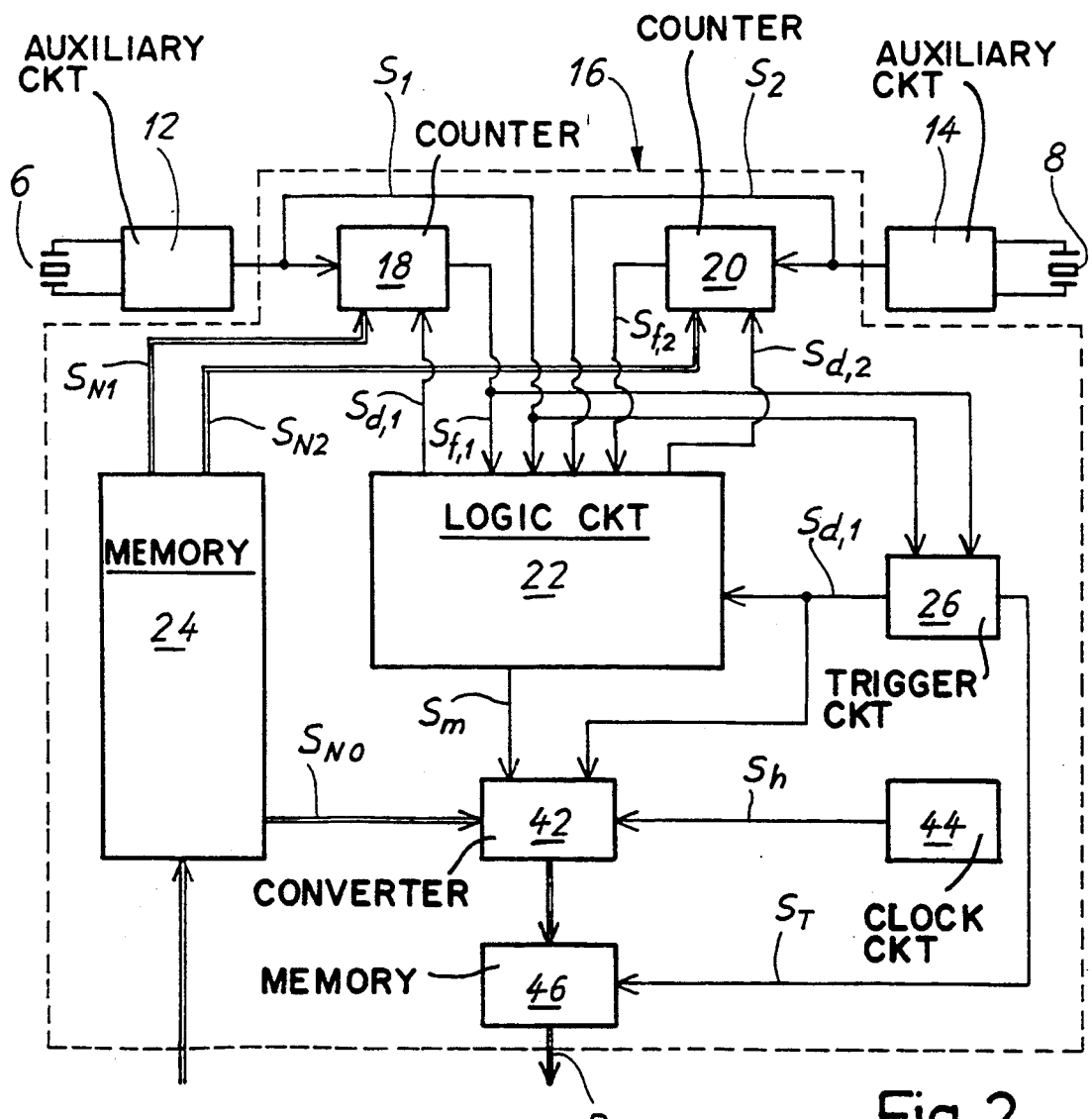
FIG. 2 is a block diagram which shows these resonators, the auxiliary circuits associated with them and the signal processing circuit in accordance with the invention when it takes the form of the embodiment chosen as an example.

The electrodes of the resonator 6 are connected to an auxiliary circuit 12, represented in FIG. 2. This circuit 12 is intended to cause continuous oscillation of the resonator 6, the whole forming a transducer which in the present case delivers a square signal $S_1$ of frequency $F_1$ and of period $T_1 = 1/F_1$, as that represented in FIG. 4, the variations of $F_1$ and of $T_1$ being representative of the constraint to which the resonator is subjected. In a similar manner, the resonator 8 is caused to oscillate by an auxiliary circuit 14, the transducer thus formed delivering a signal $S_2$ of frequency $F_2$ and of period $T_2 = 1/F_2$, like that which may also be seen in FIG. 4.

Furthermore, the accelerometer need not be arranged horizontally as in the drawing, but vertically, so that the weight of the plate 10 is directed parallel to the longitudinal direction of the resonators 6 and 8.

Under these circumstances, as long as the accelerometer is inactive, the resonators 6 and 8 retain a flat form and oscillate at their nominal natural frequencies, designated $F_{1,0}$ and $F_{2,0}$ respectively, the nominal periods which correspond to these frequencies being designated $T_{1,0}$ and $T_{2,0}$. The frequencies $F_{1,0}$ and $F_{2,0}$ may be equal. However, in the case of the accelerometer of FIG. 1 in which the resonators 6 and 8 are situated near to each other, it is preferable to adopt frequencies sufficiently different to avoid one resonator influencing the other.

When the accelerometer of FIG. 1 is subjected to a linear acceleration A directed perpendicularly to the principal faces of the resonators 6 and 8, the centre of gravity of the plate 10 of mass M is subjected to a dynamic force F = M·A. This force has the effect of causing the resonators 6 and 8 to bend, and in view of their rigid connection with the support 4 and the plate 10, to subject the first principally to an extension strain, and the second principally to a compression strain. Under these circumstances, the period $T_1$ of the signal $S_1$ diminishes in relation to the nominal period $T_{1,0}$, and the period $T_2$ of the signal $S_2$ increases in relation to the period $T_{2,0}$.

The two transducers of the accelerometer thus operate in a differential mode, the difference between the periods $T_1$ and $T_2$ or, which amounts to the same, between the frequencies $F_1$ and $F_2$, being in fact representative of the force F and of the acceleration A.

In a differential accelerometer as represented in FIG. 1, it is known that the periods $T_1$ and $T_2$ are related to the acceleration A by the relations:

$$T_1 = T_{1,0} \cdot (1 + 2 \cdot K_1 \cdot A)^{-\frac{1}{2}} \quad (1)$$

$$T_2 = T_{2,0} \cdot (1 - 2 \cdot K_2 \cdot A)^{-\frac{1}{2}} \quad (2)$$

in which $K_1$ and $K_2$ are constants which are representative of the sensitivities of the resonators 6 and 8.

These constants likewise determine the sensitivity of the accelerometer since, for a given value of the acceleration A, an increase in the values $K_1$ and $K_2$ causes an increase in the difference $T_1 - T_{1,0}$ and the difference $T_2 - T_{2,0}$.

In accordance with the invention, the acceleration A is expressed by the difference between the time interval $N_1 \cdot T_1$ and the time interval $N_2 \cdot T_2$, in which $N_1$ and $N_2$ are integers. The relationship between the difference $N_1 \cdot T_1 - N_2 \cdot T_2$ is not linear. The values of the integers $N_1$ and $N_2$ may be selected according to various criteria of which examples will be found in the course of the description.

Assuming $D_m = N_1 \cdot T_1 - N_2 \cdot T_2$. The quantity $D_m$ may be positive or negative depending on the values of $N_1$, $T_1$, $N_2$, $T_2$ This quantity may be positive for certain accelerations and negative for other accelerations, $N_1$ and $N_2$ being constant, since according to equations (1) and (2), $T_1$ diminishes with A and $T_2$ increases with A.

A processing circuit in accordance with the invention and producing a signal representative of the quantity $D_m$ is represented in diagrammatic form in FIG. 2, in which it is designated by the numerical reference 16.

This processing circuit 16 comprises essentially a first counting means 18, a second counting means 20 and a logic circuit 22.

The first counting means 18 is designed to count an integer $N_1$ of periods $T_1$ of the signal $S_1$ delivered by the auxiliary circuit 12. The integer $N_1$ may be loaded into this first counting means from a memory means 24, for example of the EEPROM type, in the form of a numerical signal $S_{N1}$ transmitted on a data bus. The commencement of counting is given by a signal $S_{d,1}$ received from the logic circuit 22. At the end of counting, the first counting means emits a signal $S_{f,1}$ to the logic circuit 22.

The second counting means 20 operates in the same manner as the first counting means 18. It receives the signal $S_2$ from the auxiliary circuit 14, a signal $S_{N2}$ representative of the integer $N_2$ from the memory means 24, and a commencement of counting signal $S_{d,2}$ from the logic circuit 22; it delivers an end of counting signal $S_{f,2}$ to the logic circuit 22.

Different values can be used for $N_1$ and $N_2$, for example according to the operating temperature of the accelerometer. These different values may be stored in known manner in the form of tables in the memory means 24.

Each counting means may be constituted for example by a binary subtractive counter (or additive counter) initially loaded with the value $+N_1$ or $+N_2$ (or $-N_1$ or $-N_2$) or by a divider with adjustable rate of division loaded with the value $N_1$ or $N_2$. As an example, 8-bit counter-divider circuits of the type 74 HC 40103 may be used; several circuits may be arranged in series to form counting means with 16, 24, 32, ... bits.

From the times of commencement of counting and the instants of finishing counting, defined by the signals $S_{d,1}$, $S_{d,2}$, $S_{f,1}$ and $S_{f,2}$, the logic circuit 22 delivers a signal $S_m$ representative of the quantity $D_m$ equal to $N_1 T_1 - N_2 \cdot T_2$.

Generally speaking, the logic circuit 22 must be designed to determine $D_m$ whatever the time intervals $N_1 \cdot T_1$ and $N_2 \cdot T_2$ and whatever their relative position in the measurement period, i.e. whether these time intervals follow one after the other, overlap or are encompassed the one in the other.

However, it is possible to always have the last situation mentioned above by appropriate selection of the values $N_1$, $N_2$ and of the displacement between the commencement of counting by each counting means.

Figure 3:
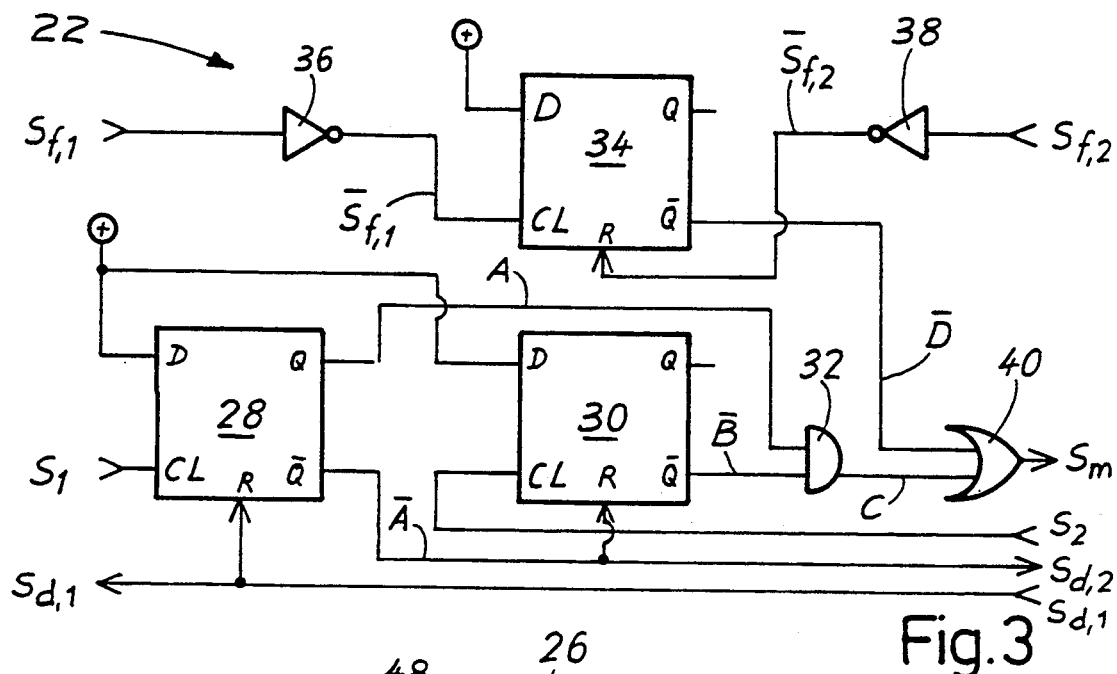
FIG. 3 is the logic circuit diagram which forms part of the circuit of FIG. 2.

An embodiment of a logic circuit of this type is represented in diagrammatic form in FIG. 3, and the signals occurring in this circuit are represented in the chronogram of FIG. 4.

The logic circuit 22 receives a signal of pulses $S_{d,1}$ from a trigger circuit 26 (FIG. 2), each pulse marking the commencement of a measurement cycle. This signal $S_{d,1}$ is transmitted directly to the first counting means 18 in order to initiate counting. More precisely, the leading edge of the signal $S_{d,1}$ has the effect of loading the integer $N_1$ into the first counting means and counting commences on the first leading edge of the signal $S_1$ following the trailing edge of the signal $S_{d,1}$. The latter is similarly applied to the reset input R of a bistable (flip flop) circuit 28 of type D. The latter receives at its clock input CL the signal $S_1$ emitted by the auxiliary circuit 12 (FIG. 2) and at its data input D a signal which is continuously at high level. The signal $\overline{A}$ delivered by the output $\overline{Q}$ of the bistable circuit 28 constitutes the commencement of counting signal $S_{d,2}$ of the second counting means, the leading edge of the signal $S_{d,2}$ having the effect of loading the integer $N_2$ into the second counting means and counting commencing on the first leading edge of the signal $S_2$ following the trailing edge of the signal $S_{d,2}$.

The bistable circuit 28 thus forms a means of synchronization, which causes counting by the second counting means to commence slightly after the start of counting by the first counting means. The time interval $T_a$ between the commencement of the two counting operations occurs in the form of a pulse of width $T_a$ in a signal C. The latter is produced in the following manner.

A bistable circuit 30 of type D receives at its respective data input D, clock input CL and reset input R a signal continuously at high level, the signal $S_2$ and the signal $\overline{A}$. It thus delivers at its output $\overline{Q}$ a signal $\overline{B}$ which passes at high level on the leading edge of the signal $\overline{A}$ and which remains at high level over a time interval $T_a$ after the signal $\overline{A}$ has dropped back to low level. The signal C is thus obtained simply by combining by means of an AND gate 32 the signal $\overline{B}$ and the signal A, inverse to the signal $\overline{A}$.

In similar manner, the time interval $T_b$ elapsing between the end of counting by the second counting means and the end of counting by the first counting means appears in the form of a pulse of width $T_b$ in a signal $\overline{D}$.

This signal is produced by the output $\overline{Q}$ of a bistable circuit 34 of type D of which the data input D, the clock input CL and the reset input R respectively receive a signal continuously at high level, the signal $\overline{S}_{f,1}$, inverse to the end of counting signal delivered by the first counting means 18, and the signal $\overline{S}_{f,2}$, inverse to the end of counting signal delivered by the second counting means 20. Inverters 36, 38 permit these signals $\overline{S}_{f,1}$ and $\overline{S}_{f,2}$ to be obtained.

It may thus be understood that this arrangement causes the signal $\overline{D}$ to be passed at high level at the end of counting by the second counting means and causes it to drop back to low level at the end of counting by the first counting means.

The logic circuit 22 finally comprises an OR gate 40 which receives the signals C and $\overline{D}$ and delivers a signal $S_m$ which has, for each measurement cycle, two pulses of lengths $T_a$ and $T_b$.

The signal $S_m$ is thus representative of the difference between the time interval $N_1 \cdot T_1$ and the time interval $N_2 \cdot T_2$, since this difference is precisely equal to the quantity $T_a + T_b$. The signal $S_m$ is thus representative of the acceleration A to which the quartz resonators 6 and 8 are subjected.

As may be seen from FIG. 2, the signal $S_m$ is received in a conversion means 42 which converts the time interval $T_a + T_b$ into an integer $D_m$. The conversion means may advantageously be in the form of a binary counter activated by the signal $S_{d,1}$ and of which the counting operation is clocked by a clock signal $S_h$ delivered by a clock circuit 44. As an example, one or more 8-bit counters of type 74HC867 may be used to form a counter with 8, 16, 24, 32, ... bits.

In the processing circuit described, the second counting means commences its counting operation after the first counting means and terminates it before. In this case, the quantity $D_m$ is equal to the sum $T_a + T_b$; a unidirectional counter 42 may therefore be used. On the other hand, in the case of a processing circuit in which, for example, the second counting means commences its counting operation after the first counting means and terminates it thereafter, the quantity $D_m$ is equal to $T_a - T_b$. A two-directional counter must then be used (additive/subtractive counter) in order to add during the time interval $T_a$ and subtract during the time interval $T_b$.

The content of the counter 42 is transmitted continuously on a data bus to a memory means 46, the final value $D_m$ of the counter content being stored in this memory means on receipt of the signal $S_T$ received from the trigger circuit 26. The signal $S_T$ marks the end of a measurement; it may be derived from the signal $S_{f,1}$.

Figure 5:
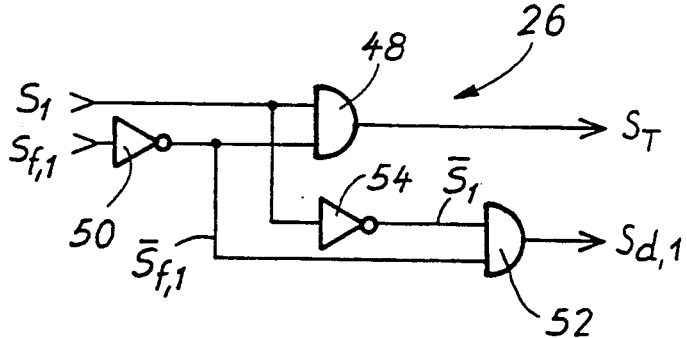
FIG. 5 is the diagram of a trigger circuit which similarly forms part of FIG. 2.
Figure 6:
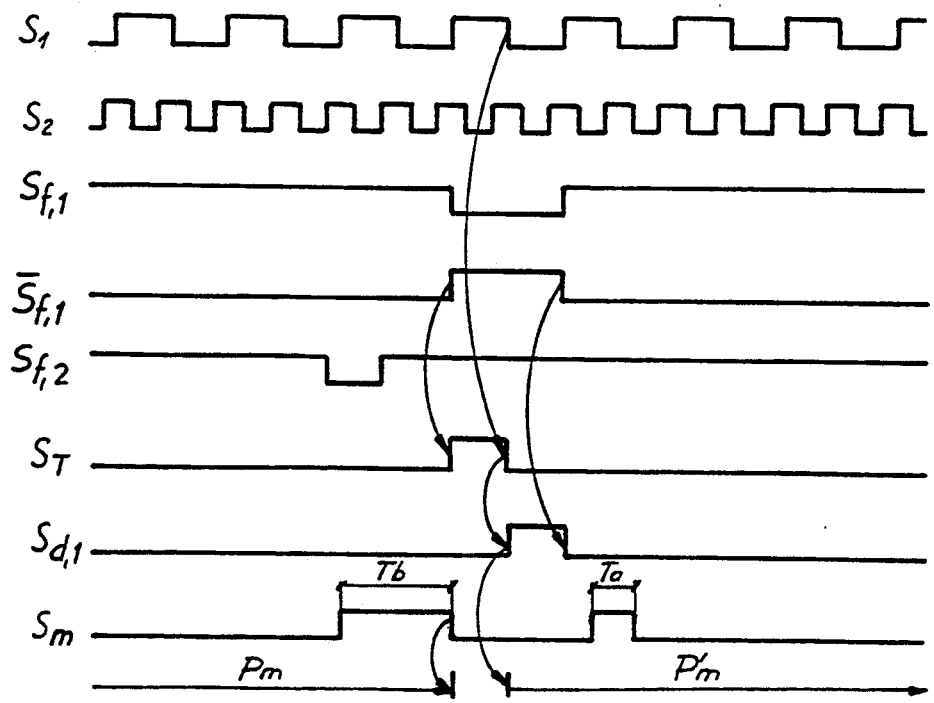
FIG. 6 is a diagram which shows the form of the signals occurring in the circuit of FIG. 5 and of some signals already represented in FIG. 4.

A form of embodiment of the trigger circuit 26 is represented in FIG. 5, and FIG. 6 shows the timing and forms of the signals occurring in this circuit and the signal $S_m$.

The trigger circuit 26 comprises an AND gate 48 receiving the signal $S_1$ and the signal $S_{f,1}$, produced by inversion of the signal $\overline{S}_{f,1}$ in an inverter 50, and an AND gate 52 receiving the signal $\overline{S}_{f,1}$ and the signal $\overline{S}_1$, produced by inversion of the signal $S_1$ in an inverter 54.

A measurement period $P_m$ terminates on the trailing edge of the pulse of width $T_b$ of the signal $S_m$. The latter occurs on a leading edge of the signal $S_1$ since, in the processing circuit described, the interval $N_1 \cdot T_1$ terminates after the interval $N_2 \cdot T_2$.

The signal $S_1$ delivered by the AND gate 48 thus possesses a pulse of width $T_1/2$ immediately after the termination of the measurement period $P_m$. This pulse loads the content of the counter 42 into the memory means 46.

The signal $S_{d,1}$ delivered by the AND gate 52 possesses a pulse of width $T_1/2$ immediately after the pulse of the signal $S_1$. The leading edge of the pulse of the signal $S_{d,1}$ marks the commencement of the next measurement period $P'_m$.

The trigger circuit 26 shown in FIG. 5 thus permits repetitive measurements of acceleration. Of course, the processing circuit in accordance with the invention could likewise be equipped with a manual trigger circuit controlling the execution of a single measurement cycle at each activation.

Referring once more to FIG. 2, it is to be noted that the conversion means could be provided, for example, by a capacitor connected to a source of current by a switch, the latter being controlled by the signal $S_m$ in order to load the capacitor during the time interval $T_a + T_b$.

However, the use of a binary counter is preferable, as the quantity $D_m$ is then a numerical value which facilitates subsequent processing by a microcomputer and makes it easier to cancel the offset of the signal $S_m$ or, which amounts to the same, of the quantity $D_m$. Let us recall in fact that for an acceleration A equal to zero, the quantity $D_m$ is equal to $N_1 \cdot T_{1,0} - N_2 \cdot T_{2,0}$ which generally differs from zero.

The offset may be simply cancelled by preloading the binary counter 42 at the commencement of each measurement cycle with the value $N_0$ equal to $-(N_1 \cdot T_{1,0} - N_2 \cdot T_{2,0}) / F_h$ in which $F_h$ is the frequency of the clock signal $S_h$. This value $N_0$ may be stored in the memory means 24 and transmitted on a data bus to the binary counter 42 in the form of a numerical signal $S_{N0}$. As for the integers $N_1$ and $N_2$, different values may be used for $N_0$ depending on the operating conditions of the accelerometer, and these values may be stored in a table in the memory means 24.

It is to be noted that it is also possible to cancel or at least minimize the offset by selecting whole integers $N_1$ and $N_2$ which cancel or minimize the value of the difference $N_1 \cdot T_{1,0} - N_2 \cdot T_{2,0}$.

Finally, it is clear that the offset may be ignored if its contribution to the quantity $D_m$ is regarded as negligible.

The solution comprising cancellation of the offset by loading the binary counter with the value $N_0$ is preferable to that comprising suppressing the offset from the outset by an appropriate adoption of integers $N_1$ and $N_2$, as the first solution places no restriction on the integers $N_1$ and $N_2$ This may be advantageously exploited to adjust the calibration of the accelerometer and/or to linearize its response curve.

In the accelerometer described, the periods $T_1$ and $T_2$ are given by the relations :

$$T_1 = T_{1,0} \cdot (1 + 2 \cdot K_1 \cdot A)^{-\frac{1}{2}} \tag{1}$$

$$T_2 = T_{2,0} \cdot (1 - 2 \cdot K_2 \cdot A)^{-\frac{1}{2}} \tag{2}$$

Generally speaking, the terms $2 \cdot K_1 \cdot A$ and $2 \cdot K_2 \cdot A$ are very small compared with unity, so that a series development may be undertaken according to the powers of A.

The calculation gives $$D_m = N_1 \cdot T_1 - N_2 \cdot T_2 = D_0 - D_1 + D_n$$

in which $$D_0 = N_1 \cdot T_{1,0} - N_2 \cdot T_{2,0}$$

$$D_1 = (N_1 \cdot T_{1,0} \cdot K_1 + N_2 \cdot T_{2,0} \cdot K_2) \cdot A$$

$$D_n = 3/2 \cdot (N_1 \cdot T_{1,0} \cdot (K_1)^2 - N_2 \cdot T_{2,0} \cdot (K_2)^2) \cdot A^2$$
$$- 5/2 \cdot (N_1 \cdot T_{1,0} \cdot (K_1)^3 \cdot N_2 \cdot T_{2,0} \cdot (K_2)^3) \cdot A^3 + (A^4)$$

In this expression, $D_0$ represents the offset, $D_1$ the linear part and $D_n$ the non-linear part.

It has already been described earlier how the term $D_0$ may be made equal to zero. It is thus possible to linearize the response curve of the accelerometer by selecting $N_1$ and $N_2$ so as to cancel, or at least minimize, the term $D_n$ too. Generally this may be achieved with very good approximation by selecting the integers $N_1$ and $N_2$ so that $N_1 \cdot T_{1,0} \cdot (K_1)^2 - N_2 \cdot T_{2,0} \cdot (K_2)^2$ is as close as possible to zero, $D_n$ then falling to the third order terms and to higher order terms which are frequently negligible.

The accelerometer may furthermore be calibrated so that the range of measurable accelerations corresponds to the maximum contents $C_{max}$ of the binary counter 42. Supposing that $D_0$ and $D_n$ are zero or negligible, the condition on the integers $N_1$ and $N_2$ for performing calibration is the quantity:

$$(A_{max} - A_{min})(N_1 \cdot T_{1,0} \cdot K_1 \cdot N_2 \cdot T_{2,0} \cdot K_2) - C_{max}/F_n$$

in which $A_{max}$ and $A_{min}$ are the maximum and minimum measurable accelerations, approaches zero.

The applicant has produced an accelerometer in accordance with FIG. 2. The set of processing circuit components 16, together with the auxiliary circuits 12 and 14 form a single integrated circuit. The principal characteristics of this accelerometer are as follows:

$$F_{1,0} = 87 \text{ kHz}$$

$$F_{2,0} = 89 \text{ kHz}$$

$F_1$ diminishes by 0.5% for the extreme value $-A_{max}$ of acceleration and $F_2$ increases by 0.5% for this same value $-A_{max}$. Therefore $F_{1,min} = 86.565$ kHz and $F_{2,max} = 89.445$ kHz.

For $N_1 = 86$ and $N_2 = 87$ (i.e. one measurement cycle of 1 ms):

$$D_0 = N_1 \cdot T_{1,0} - N_2 \cdot T_{2,0} = 10.98 \ \mu s$$

$$D_{max} = N_1/F_{1,min} - N_2/F_{2,max} = 20.81 \ \mu s$$

similarly, $D_{min} = N_1/F_{1,max} - N_2/F_{2,min} 32\ 1.15 \ \mu s$
for the value $-A_{max}$ $$\Delta D = D_{max} - D_0 = D_0 - D_{min} = 9.83 \ \mu s$$

$$F_c = 10 \text{ MHz}$$

With these characteristics, the maximum acceleration value is measured, at the output of the counter 42, with an accuracy of 1%.

It is to be noted that the accuracy increases linearly with the values of the integers $N_1$ and $N_2$. Thus, adopting $N_1 = 860$ and $N_2 = 870$, the time interval of one measurement cycle is 10 ms and the accuracy is 0.1%.

What is claimed is:

1. A circuit for processing signals supplied by two transducers measuring in the differential mode a physical parameter, one of the transducers delivering a first signal $S_1$ having a first period $T_1$ and the other transducer a second signal $S_2$ having a second period $T_2$, said first and second periods varying in inverse ratio to each other as a function of the value of said physical parameter, said processing circuit comprising:

first counting means for receiving said first signal $S_1$ and a count integer $N_1$ signal for counting the number of said periods $T_1$ of said first signal $S_1$ within a first measurement period, said first counting means outputting a signal representative of a first time interval $N_1 \cdot T_1$;

second counting means for receiving said second signal $S_2$ and a count integer $N_2$ signals for counting the number of said periods $T_2$ of said second signal $S_2$ within a second measurement period, said second counting means outputting a signal representative of a second time interval $N_2 \cdot T_2$;

a logic circuit for receiving from said first and second counting means said respective signals $N_1 \cdot T_1$ and $N_2 \cdot T_2$ and outputting a signal $S_m$ representative of the difference between said respective signals $N_1 \cdot T_1$ and $N_2 \cdot T_2$, said $S_m$ signal being representative of the value of the said physical parameter.

2. A processing circuit in accordance with claim 1, wherein said logic circuit outputs said $S_m$ signal as a binary signal, and maintains said binary signal in a determined logic state during a time interval $T_m$ equal to the difference between the time intervals of said respective signals $N_1 \cdot T_1$ and $N_2 \cdot T_2$.

3. A processing circuit in accordance with claim 2, further comprising:

conversion means for receiving said $S_m$ signal and converting said $S_m$ signal, as a function of said time interval $T_m$, to an integer $D_m$.

4. A processing circuit in accordance with claim 3, wherein said conversion means comprises a counter having a clock input and a count-enable input for receiving a clock signal $S_h$ and said $S_m$ signal, respectively.

5. A processing circuit in accordance with claim 1, wherein said one and other transducer comprise respective first and second sensors; and wherein said $S_m$ signal comprises an offset signal representative of the difference between said respective signals $N_1 \cdot T_1$ and $N_2 \cdot T_2$, in which $T_1$ and $T_2$ are the respective periods of said first and second sensors in the rest position; and wherein said processing circuit further comprises means for suppressing said offset signal.

6. A processing circuit in accordance with claim 5, further comprising:

conversion means for receiving said $S_m$ signal and converting said $S_m$ signal, as a function of a time interval $T_m$, to an integer $D_m$, said conversion means being a counter having a clock input and a count-enable input for receiving a clock signal $S_h$ and said $S_m$ signal, respectively; and wherein said conversion means is preloaded, for each measurement, with an integer $N_0$ having a value for compensating said offset signal.

7. A processing circuit in accordance with claim 1, wherein said logic circuit provides a first control signal $S_{d1}$ to said first counting means to initiate counting by said first counting means and a second control signal $S_{d2}$ to said second counting means to initiate counting by said second counting means, said first control signal being provided before said second control signal, the time interval between the providing of said first and second control signals being smaller than the maximum value of a quantity representative of the difference between said signals $N_2 \cdot T_2$ and $N_1 \cdot T_1$.

8. A processing circuit in accordance with claim 7, wherein said conversion means comprises an undirectional counter having a clock input and a count-enable input for receiving a clock signal $S_h$ and said $S_m$ signal, respectively.

9. A processing circuit in accordance with claim 1, wherein said first and second counting means respectively comprise means for loading and modifying the corresponding values of said integers $N_1$ and $N_2$.

10. A processing circuit in accordance with claim 9, further comprising:

memory means for storing at least one value for said integer $N_1$ and at least one value for said integer $N_2$.

11. A processing circuit in accordance with claim 6, further comprising:

memory means for storing at least one value for said integer $N_1$, at least one value for said integer $N_2$ and at least one value for said integer $N_0$.

12. A processing circuit in accordance with claim 1, wherein said $S_m$ signal comprises one signal component varying linearly from said to be measured physical parameter and another signal component varying non-linearly from said to be measured physical parameter, wherein said integers $N_1$ and $N_2$ are selected to minimize said another signal component.

13. A processing circuit in accordance with claim 3, wherein said integers $N_1$ and $N_2$ are selected to correspond the range of measurable values of said physical parameter to the range of possible values for said integer $D_m$ converted by said conversion means.

* * * * *